Oct. 15, 1929.    R. J. MANSFIELD    1,731,469

JOINT OF PLATE STEEL AND STRUCTURAL STEEL WORK

Filed Nov. 6, 1925

Inventor
BY Royal J. Mansfield
Vernon E. Hodges
his ATTORNEY

Patented Oct. 15, 1929

1,731,469

UNITED STATES PATENT OFFICE

ROYAL J. MANSFIELD, OF NEW YORK, N. Y.

JOINT OF PLATE STEEL AND STRUCTURAL STEEL WORK

Application filed November 6, 1925. Serial No. 67,465.

This invention relates to the joints by means of which plates are attached together to make tanks, pipe lines or the like, or by which the various members of structural steel are joined to form roof trusses, columns, etc. It pertains more particularly to those joints which must carry large stresses of compression or tension, and where it is advisable, for sake of economy, to make the joints as near 100% perfect as possible.

While the invention applies to structural steel joints, or joints by means of which the various members of a bridge, steel building, or the like, are attached, one to the other, the same idea is better described and applies in the same way to the joints of plate work, such as steel tanks, steel pipe lines, etc. In the following description, therefor, and the various drawings, joints of plate steel are particularly referred to.

It has been usual to form the joints of tanks, etc., by fastening the edges of the plates together with rivets, or bolts. To this end, holes are first punched along the edges to be joined, and then the rivets or bolts, when put through these holes, with the plates in their proper position, hold the plates together. It is self evident, that the joint is therefore weaker than the plates because of the holes. By various arrangements of rivets in the joints, it has been the aim of the designer to make the efficiency of the joint as high as possible. But never can the joint be made as strong as the plates it joins, by the usual method described.

With the usual joint, the plates are left smooth, and where used to form a tank to hold some liquid, it is difficult to hold the plates so tight together that there will be no leaks. The improvement, which is the basis of this patent application, makes it much easier to make the joint tight against leaks of liquid or gas as the case may be.

In the usual riveted or bolted joint the strength of the joint depends upon the bearing of the rivets or bolts, or the shear of the rivets or bolts. This condition requires that the rivet or bolt fill the hole completely, and this condition is seldom met. The improved joint depends upon the rivet or bolt merely to hold the plates together, or the rivet or bolt is in tension only.

Then again joints are also made by welding, instead of by rivets or bolts, and the strength of such a joint depends entirely upon how strong the weld is in tension or compression. The improved joint does not depend upon the weld except to hold the plates together in the same manner as described for rivets and bolts. It is possible to form a joint in accordance with my improvement, which is practically 100% of the strength of the plates it joins, either with rivets or bolts, or by welding.

I prefer to use both welding and bolts to form the improved joints as shown. The welding makes a perfectly tight joint, and at the same time adds much to the strength.

My improved joint is in reality the same use of materials as usual, except that I have the surfaces of the plates roughened or furrowed so they grip each other at the point of contact and are dependent largely, if not entirely, upon the shearing strength of the plates themselves, for the ultimate strength of the joints. These furrows or grooves can take a variety of shapes or directions, but the result is always to increase the strength of the joint by bringing into play the shearing strength of the plates themselves, at the point of contact.

Another advantage in this improved joint is to make bolted joints, or joints utilizing bolts, practical. Bolts cannot be used to advantage in joints bringing them into shear since the bolt does not fill the hole completely. In the improved joint, which I prefer to term a "key joint", the bolts are in tension only. The bolts merely grip, or hold the plates together. With a proper washer under the head of the bolt, it is perfectly practical to use bolts and make them hold the improved joint tight.

Where the efficiency of the joints is high, as in the improved or "key joint" the material of the plates can be made thinner, and a large saving of expense can thus be brought about. The principle is the same, whether the key is formed by alternate high and low places formed in the plate edges, or whether both plates have corresponding low places, or grooves into which is fitted a separate member or key.

Another advantage is that the thickness of the whole joint may be less because the plates fit into each other. In fact it is possible to so form the joint, that the plates so joined occupy no more room in thickness than the plates.

With these and certain other objects in view which will appear later in the specification, my invention consists in the devices described and claimed and the equivalents thereof.

Figure 1:
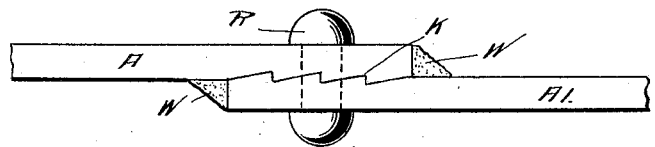
Fig. 1 is a side elevation of a riveted joint showing the invention applied thereto.

In the drawings, the letters A and A' designate the plates to be joined together. These plates may be of any suitable material and for any desired purpose, although the invention is more particularly devised for the joining of the plates forming a large tank.

In Figs. 1, 3, 4 and 5 the overlapped ends of the plates have cooperating depressions and projections formed therebetween, as designated by the letter K to prevent relative longitudinal movement of said members. These depressions and projections which interfit with each other serve to prevent the plates from moving longitudinally under tension or pressure and are sufficient to take the longitudinal strains imposed upon the plates. In order to hold the plates in overlapped abutting relations the welding W is applied at the opposite edges of the plates and, in the form shown in Figs. 1 to 4, the welding is located within the groove formed between the edge of one plate and the face of the other and substantially fills this notch or groove, while in Fig. 5 it is immediately over the joints in the opposite faces of the plates. This welding not only effectively holds the plates in close abutting relation but it also securely maintains a tight joint at such points, which is important particularly where the plates form large storage tanks for gas or similar products and where a tight joint is essential. The longitudinal pulling strains, as stated above, are imposed on the interfitting projections and depressions, while the plates are held together in abutting relation by the welding, and the two combined effectively maintains a tight joint at the overlapped edges of the plates.

Figure 2:
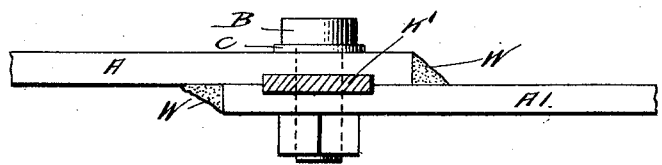
Fig. 2 is a similar view of a key joint.
Figure 3:
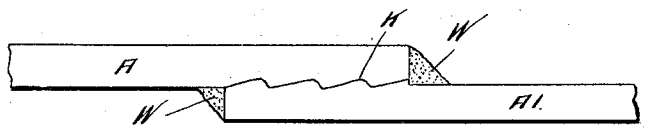
Figs. 3 and 4 are similar views of modified forms of interlocking connections between the plates.
Figure 4:
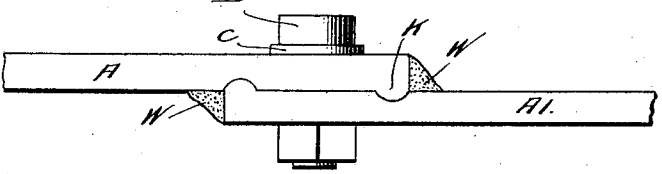
Figure 5:
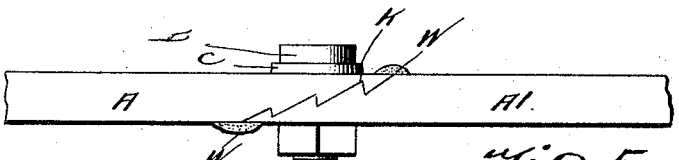
Fig. 5 shows an interlocked joint with the plates in alignment with each other.

In the form shown in Fig. 1, rivets R may also be used if desired or the bolts and washers B and C respectively, as shown in Figs. 2, 4 and 5. These only serve as additional means for holding the plates together.

In the form of joints shown in Fig. 2, instead of the interfitting corrugations and depressions, the strength of the joint depends upon the key K', which fits into corresponding grooves in the faces of both of the plates and serves the same purpose as the interfitting projections and grooves K, namely to prevent relative longitudinal movement of the plates while they are held against lateral movement or separation by welding W.

This form of joint effectively maintains a tight connection between the overlapped edges of the plates and prevents a separation of these, as often occurs where they are held together merely by bolts or rivets, even when the interfitting corrugations and depressions are used. The bolts or rivets allow the latter to separate when they become rusted or have been in use for considerable time and do not effectively maintain a tight joint, whereas the welding effectively holds the plates in overlapped and abutting relation, preventing any separation or longitudinal movement of the plates.

While I have shown my invention as applying to a joint of two plates as of a tank, the same idea holds when used for any joint to resist either tension or compression, of structural steel as well. The principle back of any such device as my invention, is that of using the shearing value of the plates, or members to be joined, through the medium of a key or the equivalent thereof.

Having thus fully described my invention, what I claim and desire to secure by Letters Patent is:

1. A metallic joint including two members having the edges thereof overlapping and having locking means within and between the adjoining faces of said overlapping edges, the edges of each of said members being welded to the other member.

2. A metallic joint including two members having the edges thereof overlapping and having co-operating depressions and projections formed between the adjoining faces of the overlapping edges to provide a lock therebetween, to prevent longitudinal movement of said members, and welding between the edge of one member and the face of the other for holding the members together.

3. A metallic joint including two members having the edges thereof overlapping and having locking means within and between the adjoining faces of said overlapping edges, the extreme outer edge of each member being welded to the other member.

4. A metallic joint including two members having the edges thereof overlapping and having cooperating depressions and projections formed between the adjoining faces of the overlapping edges to provide a lock therebetween to prevent longitudinal movement of said members, the extreme outer edge of each member being welded to the other member to hold the members together.

5. A metallic joint including two members having the edges thereof overlapping and having cooperating depressions and projections formed between the adjoining faces of the overlapping edges to provide a lock therebetween, to prevent relative longitudinal movement of said members, and welding substantially filling the notch formed between the extreme outer edge of each of the members and the adjacent face of the other member.

6. The method of fastening two members together, face to face, consisting in overlapping their edges with cooperating depressions and projections formed between the adjoining faces of said overlapping edges to provide a lock therebetween to prevent longitudinal movement of said members, and substantially filling the notch formed between the outer edge of one member and the adjacent face of the other with welding to hold the members together.

ROYAL J. MANSFIELD.